US012576970B2

(12) United States Patent
Schneider et al.

(10) Patent No.: US 12,576,970 B2
(45) Date of Patent: Mar. 17, 2026

(54) WATER SUPPLY SYSTEM FOR AN AIRCRAFT

(71) Applicant: Airbus Operations GmbH, Hamburg (DE)

(72) Inventors: Frank Schneider, Hamburg (DE); Hannes Müller, Hamburg (DE); Axel Schreiner, Hamburg (DE); Michael Rempe, Hamburg (DE); Tim Lübbert, Hamburg (DE); Frederik Albers, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 4 days.

(21) Appl. No.: 18/671,471

(22) Filed: May 22, 2024

(65) Prior Publication Data

US 2024/0400205 A1 Dec. 5, 2024

(30) Foreign Application Priority Data

May 30, 2023 (EP) .................................... 23176111

(51) Int. Cl.
*E03B 7/07* (2006.01)
*B64D 11/02* (2006.01)
*B64D 11/04* (2006.01)

(52) U.S. Cl.
CPC .............. *B64D 11/04* (2013.01); *B64D 11/02* (2013.01); *E03B 7/071* (2013.01)

(58) Field of Classification Search
CPC ......... E03B 7/071; B64D 11/02; B64D 11/04; Y10T 137/85946

(Continued)

(56) References Cited

U.S. PATENT DOCUMENTS 4,202,061 A * 5/1980 Waters .................. B64C 1/1453
                                                        4/300
5,035,011 A * 7/1991 Rozenblatt ............. B64D 11/02
                                                        4/316

(Continued)

FOREIGN PATENT DOCUMENTS

EP       2757204 A1    7/2014
EP       4108570 A1    12/2022

OTHER PUBLICATIONS

Extended European Search Report issued in European Application No. 23176111.5, mailed Oct. 13, 2023, 12 pages.

*Primary Examiner* — William M McCalister
(74) *Attorney, Agent, or Firm* — KDW Firm PLLC

(57) ABSTRACT

A water supply system for an aircraft and a method for draining water from or passing air into or out of a buffer tank of a water supply system in an aircraft. The system includes a water buffer tank having a fluid inlet and outlet, a supply arrangement for selective flow from the fluid outlet to a user equipment, and a relief arrangement for permitting fluid flow from the fluid outlet. The relief arrangement includes a relief conduit having a separation element with a separation element inlet positioned above a separation element outlet and separated therefrom by a separation distance such that water flowing in a forwards direction therethrough flows from the inlet to the outlet across the separation distance, and water flowing in a reverse direction therethrough flows into the separation element outlet and is retained therein, and wherein the separation element is defined by the user equipment.

20 Claims, 7 Drawing Sheets

(58) Field of Classification Search
USPC ........................................................ 137/562
See application file for complete search history.

(56)                    References Cited

U.S. PATENT DOCUMENTS

| | | | | | |
|---|---|---|---|---|---|
| 5,245,711 | A | * | 9/1993 | Oldfelt | E03D 5/00 |
| | | | | | 4/431 |
| 5,769,124 | A | * | 6/1998 | Ehrhardt | B64D 11/02 |
| | | | | | 137/899.2 |
| 2009/0212161 | A1* | | 8/2009 | MacKulin | B64C 1/1453 |
| | | | | | 244/129.1 |
| 2010/0221642 | A1* | | 9/2010 | Frahm | B64D 41/00 |
| | | | | | 429/512 |
| 2013/0305444 | A1* | | 11/2013 | Boodaghians | E03F 1/006 |
| | | | | | 4/323 |
| 2013/0312853 | A1* | | 11/2013 | Burd | F16K 17/048 |
| | | | | | 137/535 |
| 2014/0059754 | A1* | | 3/2014 | Hermon | C02F 1/444 |
| | | | | | 4/318 |
| 2014/0061112 | A1* | | 3/2014 | Burd | B64D 11/02 |
| | | | | | 210/234 |
| 2014/0123383 | A1* | | 5/2014 | Detjen | B64D 11/02 |
| | | | | | 4/670 |
| 2015/0040311 | A1* | | 2/2015 | Hennings | G01F 23/266 |
| | | | | | 73/304 C |
| 2016/0236247 | A1* | | 8/2016 | Boukari | B08B 9/0321 |
| 2017/0050732 | A1* | | 2/2017 | Burd | B64D 11/04 |
| 2018/0291595 | A1* | | 10/2018 | Lübbert | B64D 11/04 |
| 2022/0342431 | A1* | | 10/2022 | Schreiner | B64D 11/02 |
| 2023/0160772 | A1* | | 5/2023 | Agarwal | E03B 7/071 |
| | | | | | 73/164 |
| 2023/0287665 | A1* | | 9/2023 | Muller | B64D 11/02 |
| 2023/0382532 | A1* | | 11/2023 | Rempe | B64D 11/02 |

* cited by examiner

WATER SUPPLY SYSTEM FOR AN AIRCRAFT

TECHNICAL FIELD

The disclosure herein relates to a water supply system for use in an aircraft. Further aspects of the disclosure herein relate to a method for draining excess water from or passing air into or out of a buffer tank in an aircraft (e.g. so as to allow air to enter into or escape from the buffer), and an aircraft itself.

BACKGROUND

The described water supply system (e.g. potable water supply system) for use in an aircraft comprises a buffer tank comprising a fluid inlet and at least one fluid outlet as well as a supply arrangement for selectively permitting fluid flow from the at least one fluid outlet to a user equipment via a supply conduit and a relief arrangement for selectively permitting fluid flow from the at least one fluid outlet.

The supply arrangement may be operable by a user to selectively permit fluid flow from the at least one fluid outlet to a user equipment. For example, the supply arrangement may comprise a valve or plurality of valves that are collectively and/or individually operable e.g. by a user to selectively permit fluid flow from the at least one fluid outlet to a user equipment. The relief arrangement may permit fluid flow (e.g. selectively permit fluid flow) from the at least one fluid outlet to a user equipment or a fluid flow, such as an air flow, from the user equipment to the fluid outlet, which may be the same user equipment or may be a different user equipment to which the supply arrangement permits fluid flow. Thus, the relief arrangement allows for the relief of an overpressure or a negative pressure above certain thresholds in the buffer.

The relief arrangement comprises a relief conduit in fluid communication with the at least one fluid outlet, and the relief conduit comprises a separation element comprising a separation element inlet positioned above a separation element outlet and separated therefrom by a separation distance such that water flowing in a forwards direction therethrough flows from the inlet to the outlet across the separation distance, and water flowing in a reverse direction therethrough is retained within the separation element outlet (e.g. so as to prevent the water retained therein from flowing back into the outlet of the separation element). The water retained within the separation element outlet may be temporarily retained. Further, the separation element is defined by the user equipment, for example wholly or partially defined by a user equipment. The separation element outlet may be defined by the user equipment and/or the separation element inlet may be defined by the user equipment.

The potable water system may be used to provide fresh water in a sufficient amount and quality to all kinds of user equipment on-board large passenger aircraft. The water is stored in a centralized water tank and is distributed via a pipe network towards the user equipment. In conventional systems stainless steel or titanium pipes with a diameter between ½ inch and ¾ inch are used.

Some newer approaches to the potable water system focus on flexible, small diameter plastic hoses to form a water distribution system (e.g. PEEK hoses for the High Pressure Potable Water System with di=4 mm and da=6 mm). An example of a system and method for heating water for a consumer unit in an aircraft is disclosed in EP 4 108 570 A1. An example of a high pressure potable water supply and distribution system is described in U.S. Pat. No. 10,822,774. This system involves decentralized water storage tanks, often termed buffer tanks, being continuously supplied with water at an average supply rate while the buffer tank capacity absorbs any differences between the consumer supply needs and the volume of water being supplied.

Different buffer designs are known such as pressurized buffers or unpressurized buffers that require an overflow or overpressure relief line (e.g. a ventilation line). In addition, it is also required for these buffers that air may enter the buffer when water is released via the user equipment. For controlled drainage of excess water a connection to a drain, for example to the wastewater or vacuum toilet system may be provided. However, in cases where a relief line provides fluid flow to a drain, regulatory requirements require steps to be taken to ensure that wastewater does not unintentionally flow back from the drain and into a buffer tank, thereby contaminating the supply therein. In particular, the regulatory requirements specify that a separation element is mandatory to prevent undesired backflow. A standard design of a separation element involves provided an interruption in a flow line and flowing a fluid through an air gap and into a funnel, where it may then re-enter the flow line.

However, such a separation element requires a relatively large installation space and presents a risk of flooding in an aircraft where there is a large enough volume of backflow to overcome the capacity of the separation element (e.g. the funnel) to retain the backflowing water therein, or where the separation element becomes clogged. Such clogging may remain undetected until such a time as it poses a significant problem to the aircraft, and even when not clogged, the separation element represents an outlet that may become malodorous over time, for example due to bacteria build-up.

SUMMARY

It is therefore an object of the disclosure herein to provide a system having a separation element that does not take up excessive additional space within an aircraft, and in which blockages and other adverse conditions are able to be easily identified.

The object is achieved in that the separation element is defined by a user equipment. Since the user equipment would be present in the aircraft anyway, the separation element requires no additional space. Further, user equipment is likely to be used and cleaned on a regular basis, making the identification of clogs, overflow and bacterial growth both less likely to occur and more noticeable (and therefore more likely to be fixed before becoming a serious problem) without requiring any additional effort, since cleaning and use of the user equipment is likely to be routine anyway. Further, by defining the separation element in or by a user equipment, it is possible to achieve a relatively large separation distance, which is generally more desirable than a smaller separation distance.

According to an embodiment, the user equipment may be or comprise a sink. The separation element may be partially or wholly defined by the sink. The sink may comprise or define one or both of the separation element inlet and separation element outlet. For example, the sink may comprise or define a separation element inlet that may be fluidly connected to the relief conduit, and/or may comprise or define a separation element outlet that may be fluidly connected to the relief conduit.

According to another embodiment the user equipment is formed by a galley insert (GAIN) which comprises the separation element so that it is associated with a device in a galley such as a coffee machine or a beverage dispenser. In this case the relief conduit with the separation element may be integrated in the GAIN, e.g. the relief conduit is partly arranged within the GAIN housing or positioned adjacent to the GAIN housing and the separation element may be defined by a water collection member such as a drip tray being connected to a wastewater system and an opening of the relief conduit which opening is arranged vertically above and at a separation distance from the collection member and forms the separation element inlet. The collection member then forms the separation element outlet. Furthermore, the supply conduit may also be partially integrated in the GAIN. Here, it is preferred when the relief conduit is separated (e.g. entirely separated) from the supply conduit.

According to an embodiment the relief conduit may be in fluid communication with a faucet. The faucet may be or comprise at least a part of the user equipment. For example, the separation element inlet may be defined by a faucet. The relief conduit, and optionally the supply conduit, may be at least partially integrated into the faucet and the relief conduit may be preferably separated (e.g. entirely separated) from the supply conduit. The faucet may be a user operable faucet, for example for the purpose of hand washing in an aircraft lavatory, and may be located in the aircraft lavatory. The faucet may comprise or define a separation element inlet that may be fluidly connected to the relief conduit. The faucet may comprise a faucet supply outlet in fluid communication with the supply arrangement. The faucet supply outlet may additionally be in fluid communication with the relief arrangement (e.g. the relief conduit of the relief arrangement), such that the faucet need comprise only one outlet which may simplify the design thereof. In an alternative embodiment, the faucet may comprise a supply outlet and a separate relief outlet, which may be a more user-friendly design, avoiding confusion as a result of water flowing from the faucet despite the faucet appearing to be closed. In such an example the supply outlet is in fluid communication with, and/or forms part of, the supply arrangement and the relief outlet is in fluid communication with, and/or forms part of the relief arrangement.

The separation element outlet may be defined by a sink. The separation outlet, e.g. the sink, may be located in an aircraft lavatory or galley. The sink may be positioned adjacent the faucet (e.g. below the faucet) such that water from the faucet flow into the sink. The sink may comprise a substantially funnel shape. The sink may comprise a bowl, or bowl-shaped portion, which may be able to retain a volume of liquid therein, e.g. temporarily retain a volume of liquid therein. The sink may comprise a plughole that is fluidly connected to the relief conduit. The sink may comprise a fluid connection to a drain or drainage system, e.g. of an aircraft.

The buffer tank may be a pressurized tank and may comprise a pressure sensor. The pressure sensor may measure the pressure inside the buffer tank (e.g. of the water volume inside the buffer tank). The relief conduit may comprise a relief valve. The relief valve may be operable (e.g. selectively operable) by a user and therefore the relief valve may function to selectively permit fluid flow from the at least one fluid outlet of the buffer tank and through the relief conduit. The relief valve may be operable by a control unit (e.g. an actuator thereof). The potable water system may comprise a control unit in communication with the pressure sensor. The control unit may be configured to receive and process data from the pressure sensor to operate the relief valve. The control unit may be configured to configure the relief valve to an open position when the pressure inside the buffer tank is equal to or more than a threshold value, and to configure the relief valve to a closed position when the pressure inside the buffer tank is below a threshold value. The relief valve may comprise a relief mechanism (e.g. a mechanically and/or hydraulically controlled mechanism) configured to permit fluid flow from the relief valve inlet to the relief valve outlet when the pressure at the relief valve inlet surpasses a predetermined value. Where the relief valve comprises a relief mechanism, the buffer tank may additionally comprise (or may not comprise) the aforementioned pressure sensor, and may or may not be operable by a control unit, for example may e operated by the control unit in the instance where an overflow condition is present.

The buffer tank may comprise a volume of gas (e.g. air). The volume of gas may be pressurized so as to pressurize the interior of the buffer tank. The volume of gas may be separated from the water in the buffer tank by a partition element, for example a partition element that is moveable within the tank to vary the volume of gas therein. The volume of gas may be contained within an expandable/retractable bladder inside the buffer tank. The buffer tank may comprise a pressurized gas inlet, which may comprise a valve therein. The valve may be used to increase or decrease the volume of gas inside the buffer tank, and therefore control the pressure inside the buffer tank. The volume of gas may be held at a pressure through use of any appropriate structure, for example through use of a linear actuator, a metal bellows, a spring mechanism which may, for example, apply a force (e.g. a pressure) to the partition element and/or the bladder to adjust the pressure of the volume of gas. As an alternative, it is also conceivable that mechanical devices such as a linear actuator, a metal bellows, a spring mechanism etc. apply a force or a pressure directly to the water in the buffer tank so as to pressurize the latter.

The at least one fluid outlet may be a relief and supply outlet. The relief and supply outlet may be fluidly connected to both the supply arrangement and the relief arrangement. The supply arrangement may comprise a supply conduit that fluidly connects the buffer tank to the user equipment to provide a supply of water thereto for use by a user. Both the supply conduit and the relief conduit may be in fluid communication with the relief and supply outlet and at least part (or the entirety) of the relief conduit may be defined by the supply conduit.

In some embodiments, the supply conduit may comprise a supply valve which is the same valve as the relief valve, which may assist to simplify the system. In such embodiments, at least part or the entirety of the supply conduit may be the relief conduit. The supply arrangement and the relief arrangement may thus be the same, e.g. structurally identical, defined by the same components, again simplifying the system. Similar to as previously described, such a supply valve may be electrically controlled (e.g. by the actuator of a control unit) and/or may be mechanically controlled. In the case where the pressure at the inlet of the valve reaches a predetermined pressure threshold, the valve may comprise a relief mechanism enabling fluid to flow therethrough.

The at least one fluid outlet may comprise a relief outlet positioned in an upper half (e.g. an upper third, quarter, at or adjacent the top, uppermost portion, wall or cover, or the like) of the buffer tank, and a supply outlet may be positioned at or adjacent the base (at or adjacent the lowest point, in the lower half, third, quarter, or the like) of the buffer tank.

The supply arrangement may comprise a supply conduit fluidly connecting the supply outlet of the buffer tank to a user equipment, the supply conduit being separate (e.g. entirely separate) from the relief conduit (and both leading to the user equipment). Both the supply conduit and the relief conduit may be in fluid communication with the user equipment. The supply conduit and the relief conduit may be combined in or at the separation element. For example, wherein the user equipment comprises a faucet, the supply conduit and the relief conduit may be combined inside the faucet, or may be combined upstream of the faucet such that only a single inlet to the faucet is required. Alternatively, both the supply and relief conduit may have separate inlets to the faucet and may remain separate. The faucet may have a single outlet, or may have a supply outlet for use by a user (e.g. for hand washing) and a relief outlet which is separate from the supply outlet.

In some embodiments, the diameter of the relief conduit may be greater than the diameter of the fluid inlet of the buffer tank. In some embodiments, the diameter of the at least one fluid outlet of the buffer tank may be greater than the diameter of the fluid inlet. The diameter of the relief outlet of the buffer tank may be greater than the diameter of the fluid inlet of the buffer tank. As such, when relief is desired, the relief may be able to reduce the pressure and/or volume of fluid in the buffer tank regardless even at a maximum flow rate through the fluid inlet.

The separation element inlet may be separated from the separation element outlet by a separation distance of at least twice the diameter of the relief conduit.

An aspect of the disclosure herein relates to a method for draining water from a buffer tank in an aircraft, such as a buffer tank of a potable water system as described in relation to the previously described aspect. The method comprises providing a buffer tank comprising a fluid inlet and at least one fluid outlet in fluid communication with a relief conduit of a relief arrangement. The method comprises providing a user equipment defining a separation element, the separation element comprising a separation element inlet positioned above and separated from the separation element outlet by a separation distance.

Further, the method comprises establishing a flow of water between the at least one fluid outlet of the buffer tank and the user equipment via the relief conduit and separation element (e.g. through the separation element) such that a flow of water flowing through the separation element in a forwards direction flows from the separation element inlet to the separation element outlet across the separation distance, and a flow of water flowing in a reverse direction is retained within the separation element outlet, or establishing a flow of air between the user equipment and the at least one fluid outlet of the buffer tank via the relief conduit and the separation element such that a flow of air flowing through the separation element in a rearwards direction from the separation element inlet to the at least one fluid outlet or in a forwards direction from the at least one fluid outlet to the separation element inlet, and that a flow of water flowing in a reverse direction is prevented within the separation element outlet.

The method may comprise pressurizing the buffer tank, for example so as to propel a flow of water from the fluid outlet. As such, no pump may be needed downstream of the buffer tank in the system, reducing the complexity thereof. The method may comprise supplying the buffer tank with a flow of water, which may be at a high pressure (e.g. above a predetermined pressure threshold). The method may comprise pressurizing the buffer tank with a volume of air. The volume of air may be held in a bladder of air within the buffer tank, and the method may therefore comprise holding a bladder of air in the buffer tank. The method may comprise selectively increasing or decreasing the volume of air in the buffer tank (e.g. the volume of air inside the bladder in the buffer tank) to vary the pressure inside the buffer tank.

The method may comprise measuring the pressure inside the buffer tank and controlling the flow of water between the fluid outlet and the user equipment based on the measured pressure. The method may comprise flowing water from the buffer tank (e.g. via the relief arrangement, via the relief conduit of the relief arrangement) when the pressure inside the buffer tank raises above a predetermined value.

An aspect of the disclosure herein relates to an aircraft comprising the water supply system described in any of the previous paragraphs.

Although the term "conduit" has been used above, it should be noted that this may refer not to a single conduit, but to an arrangement of conduits. For example, the supply conduit and/or the relief conduit may refer to a plurality of connected conduits, connected to form the larger supply and/or relief conduit. Further, the relief arrangement and in particular the relief conduit(s) may comprise a filter or sieve so as to prevent that particles or even insects are entrained into the relief arrangement when there is an air flow in the reverse direction.

BRIEF DESCRIPTION OF THE DRAWINGS

Furthermore, it is to be noted that above-described different embodiments of user equipment being provided may be combined in a sole water supply system.

DETAILED DESCRIPTION

Figure 1:
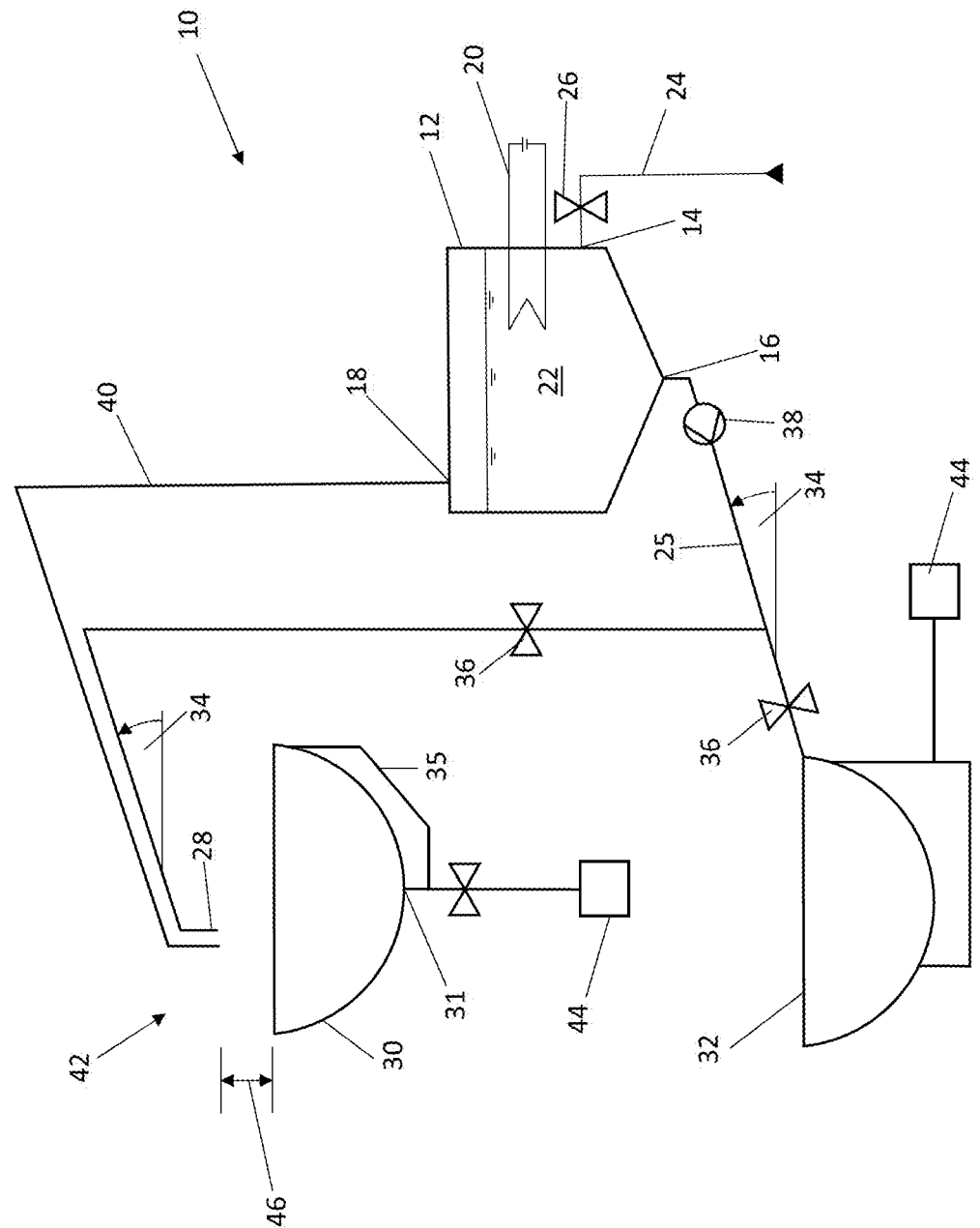
FIG. 1 is a potable water system comprising a non-pressurized buffer tank.

FIG. 1 illustrates a potable water system 10 according to the present disclosure. The potable water system 10 comprises a buffer tank 12 which in this example comprises a fluid inlet 14, a supply outlet 16 and a relief outlet 18, as well as a supply arrangement and a relief arrangement. As will be described, the supply arrangement permits fluid flow from the supply outlet 16 to a user equipment (in this example two user equipments are described), and the relief arrangement permits fluid flow from the relief outlet 18 and comprises a separation element 42.

The buffer tank 12 in this example is a non-pressurized buffer tank 12, and the supply outlet 16 is positioned at the base thereof in order to facilitate the flow of water from the buffer tank 12 under gravity. The relief outlet 18 is positioned on a top surface of the buffer tank 12 in this example such that water is able to flow therefrom once the buffer tank 12 is completely full (e.g. water may overflow through the relief outlet 18). In addition to water outflow, the relief outlet 18 may also permit the flow of air, or a mixture as air and water, therefrom so as to prevent pressure build-up in the buffer tank 12 as it is filled. Equally the relief outlet 18, and the associated relief conduit 40, may permit the inflow of air to the buffer tank 12 so as to prevent build-up of negative pressure therein as the buffer tank 12 is emptied. It should be noted that in some examples the supply outlet 16 may be positioned adjacent the base, in the lower quarter, third, half or the like, while the relief outlet 18 may be positioned adjacent the top surface, in the upper quarter, third, half or the like of the tank 12.

The buffer tank 12 optionally comprises a heating element 20 to provide temperature control of the fluid volume 22 inside the buffer tank 12.

Water is supplied to the fluid inlet 14 of the buffer tank 12 via a water inflow line 24. The water inflow line 24 comprises an inlet valve 26 therein for controlling inflow of water to the buffer tank 12.

In this example, the supply arrangement comprises a supply conduit 25 fluidly coupled to the supply outlet 16 and fluidly connecting the supply outlet 16 to a user equipment or equipments. The supply conduit 25 comprises, in this example, a supply pump 38 to propel water from the buffer tank 12. In this example, two user equipments are illustrated in the form of a faucet 28 and sink 30 (e.g. a washbasin) which may be positioned in an aircraft lavatory or galley, and a toilet 32, although it should be noted that more or fewer user equipments compared to those that are illustrated may be provided. The supply conduit 25 of this example comprises a branched section so as to permit the supply of two (or more) user equipments, with one branch flowing to each user equipment. Each of the branches providing water to the user equipment comprises an incline 34 such that water in the branch tends to flow out of the branch under gravity and into the user equipment. It should be noted that in some examples, the incline may be a negative incline such that the water flows therefrom and back towards the buffer tank 12. Each of the branches additionally comprises a supply valve 36 which may be controlled by a user in order to selectively receive water at the respective user equipment when desired. Control of the supply valve 36 may be mechanical or electrical.

Here, the relief arrangement comprises a relief conduit 40 that is fluidly coupled to the relief outlet 18 and permits fluid flow from the buffer tank 12, for example in case of an excess volume of water flowing into the buffer tank 12. The relief conduit 40 permits fluid flow from the relief outlet 18 to a wastewater drain 44, illustrated schematically in FIG. 1, and may additionally provide for the flow of air, or an air and water mixture, from the relief outlet 18 and equally for the flow of air in the reverse direction back into the buffer tank 12. Further, the relief conduit 40 may comprise a filter or sieve so as to prevent that particles or even insects are entrained into the relief conduit 40 when there is an air flow in the reverse direction. In addition, it is conceivable that the sieve or filter is arranged in other part of the relief arrangement to prevent particles and or insects to reach the buffer tank 12. The wastewater drain 44 may simply be a holding location for wastewater in an aircraft, may comprise a wastewater processor, may be a chemical treatment system for wastewater, or the like. The relief arrangement 40 additionally comprises a separation element 42 which in this example is defined by the faucet 28 and sink 30. In this example, the relief conduit 40 fluidly connects the relief outlet 18 to the faucet 28. The relief conduit 40 may be integrated (e.g. at least partially integrated) into the faucet 28. The faucet 28 comprises a faucet supply outlet to permit water provided by the supply conduit 25 to flow from the faucet 28 when required by a user. The faucet 28 may additionally comprise a faucet relief outlet, which may be separate or integrated with the supply outlet. In some cases, the relief conduit 40 and the supply conduit 25 may combine upstream of the faucet 28 or in the faucet 28 itself, such that only a single faucet outlet is required on the faucet 28. In other examples, the relief conduit 40 and the supply conduit 25 may both be integrated and separate within the faucet 28, optionally where only the outlets of the relief conduit 40 and the supply conduit 25 are combined e.g. at a single outlet of the faucet 28.

Here, the outlet of the faucet 28 is separated from the sink 30 by a separation distance 46, such that water flows in a forwards direction from the inlet of the separation element 42 (e.g. the faucet 28 comprising the faucet outlet) across the separation distance 46 and to the outlet of the separation element 42. In the case of reverse flow, water (e.g. wastewater) would be retained within the sink until, for example, the flow conditions changed direction at which point the wastewater would be retained in the sink 30. Even in the case where the main outlet 31 (e.g. the plughole) of the sink is blocked, water would still be able to flow from the sink via the overflow line 35, and even if both the plughole 31 and overflow 35 are blocked, the water would simply flow out of the sink 30 and onto the floor, but never back into the relief conduit 40 and into the buffer. Thus, in the presently illustrated potable water system 10, the separation element is defined by the sink 30 and faucet 28, for example of the lavatory of an aircraft. Since these components are present in an aircraft anyway, the potable water system saves space relative to those known in the art. A faucet and sink are components that are used frequently in an aircraft, and are also easily accessible and cleaned regularly. Thus, the problem of bacterial build-up and blockages forming in the separation element is reduced, since these problems are likely to be addressed by regular cleaning.

Figure 2:
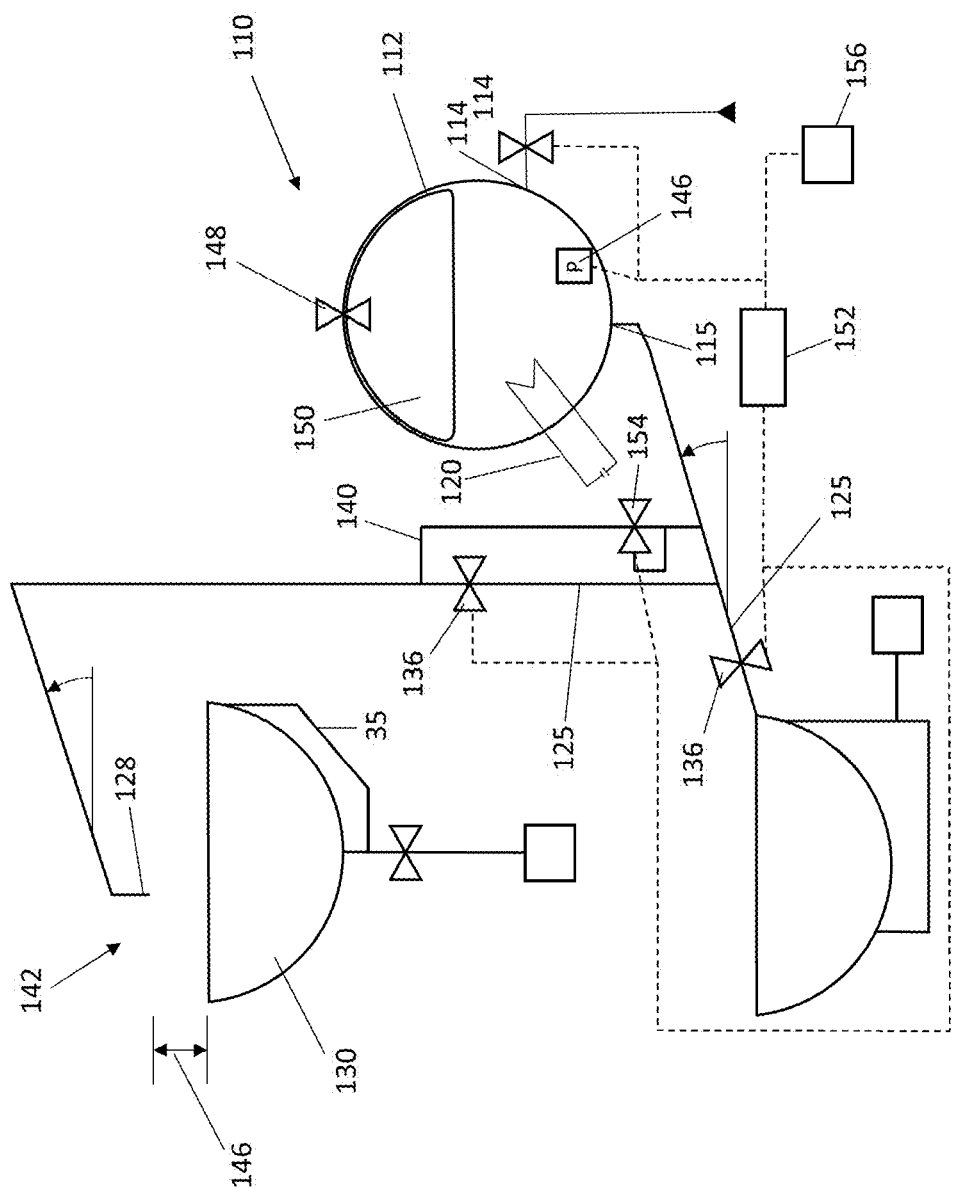
FIG. 2 is a potable water system comprising a pressurized buffer tank.

FIG. 2 illustrates a similar potable water system 110 to that of FIG. 1 and therefore comprises several similar components. Similar components have been provided with the same reference numerals as in FIG. 1, augmented by 100, and duplicate description of similar components has been avoided where possible.

In FIG. 2, the buffer tank 112 is a pressurized buffer tank 112 and comprises a fluid inlet 114 and a combined relief and supply outlet 115. In addition, the pressurized nature of the buffer tank 112 means that the buffer tank takes the shape of a pressure vessel (e.g. a rounded shape) to avoid stress concentrations therein. The buffer tank 112 additionally comprises a pressure sensor 146 and a gas refill valve 148. The gas refill valve 148 is in fluid communication with a volume provided in the buffer tank 112. The volume (e.g. the volume of gas/air) may be simply provided in the buffer tank 112, or may be provided in a bladder within the buffer tank. In providing the air in a bladder, this may reduce the risk that opening the gas refill valve 148 will result in an outflow of water. The pressure relief valve 154 may be used to provide some degree of control over the pressure in the buffer tank 112, for example for the purpose of ensuring that there is sufficient pressure in the buffer tank 112 to provide a connected user equipment water having a sufficient pressure, while the gas refill valve 148 may be used to ensure that the level of gas in the buffer tank 12 is kept at a consistent level.

As in FIG. 1, the system 110 of FIG. 2 comprises a heating element 120. The heating element 120 may be an optional element.

While in FIG. 1, the relief outlet 18 acted as an overflow outlet and permitted excess water to be taken from the buffer tank 12 in the case of overflow (and was thus positioned at or near the top of the buffer tank 12), since the buffer tank 112 of FIG. 2 is a pressure tank, the relief outlet 115 may instead act as an overpressure outlet. As such, there is no benefit to positioning the relief outlet 115 at or near the top of the tank, and thus it may be combined with the supply outlet 115.

Since the supply and relief outlets are combined into a single outlet 115 in this example, a single conduit may also be coupled to this outlet 115. This conduit may function as both the supply conduit 125 and the relief conduit 140, and in this example branches off into a separate relief and a supply conduit 125, 140 downstream of the relief and supply outlet 115.

In this example, the system 110 comprises a control unit 152 which is in communication (e.g. data communication) with the pressure sensor 146. The pressure sensor 146 is configured to measure the pressure inside the buffer tank 112 and in this example is positioned within the buffer tank 112. Data from the pressure sensor 146 is provided to the control unit 152 (e.g. by a wired data connection, wirelessly, or the like). The control unit may then be able to process and compare this data to expected data, and take action as a result, for example to avoid an overpressure condition occurring in the buffer tank 112. The control unit 152 is additionally connected (e.g. operably connected) to a relief valve 154 (which may be an over pressure valve) such that the control unit 152 is able to configure the relief valve 154 between an open and a closed position, or provide an alert to a user that the relief valve should have one configuration or another, based on the data provided to it (e.g. relating to the pressure in the buffer tank 112). The relief valve 154 may be electrically operable or mechanically operable, or both electrically and mechanically operable. For example, the relief valve 154 may normally be electrically operable but may be mechanically operable in the case that an overflow condition is detected, for example by providing a mechanically operable mechanism inside the relief valve 154 that is triggered to allow flow therethrough at a predetermined pressure threshold. Optionally, the control unit 152 may be connected to the supply valve or valves 136, and therefore may additionally be used to control the supply of water to the user equipment or equipments.

The control unit 152 may additionally be in data communication with the aircraft data network 156, schematically illustrated in FIG. 2.

As in FIG. 1, the separation element 142 is defined by a sink 130 and a faucet 128. Upstream of the faucet 128, the branch of the supply conduit 125 fluidly connecting the separation element 142 to the buffer tank 112 combines with the relief conduit 140 such that the faucet 128 is fluidly connected to a single conduit, which is the combined relief and supply conduits 125, 140, as opposed to the faucet 128 of FIG. 1 which is fluidly connected to both the relief and supply conduits 125, 140 separately.

As in FIG. 1, the faucet outlet is located above and separated from the sink 130 by a separation distance 146 so as to define the separation element 142.

Figure 3:
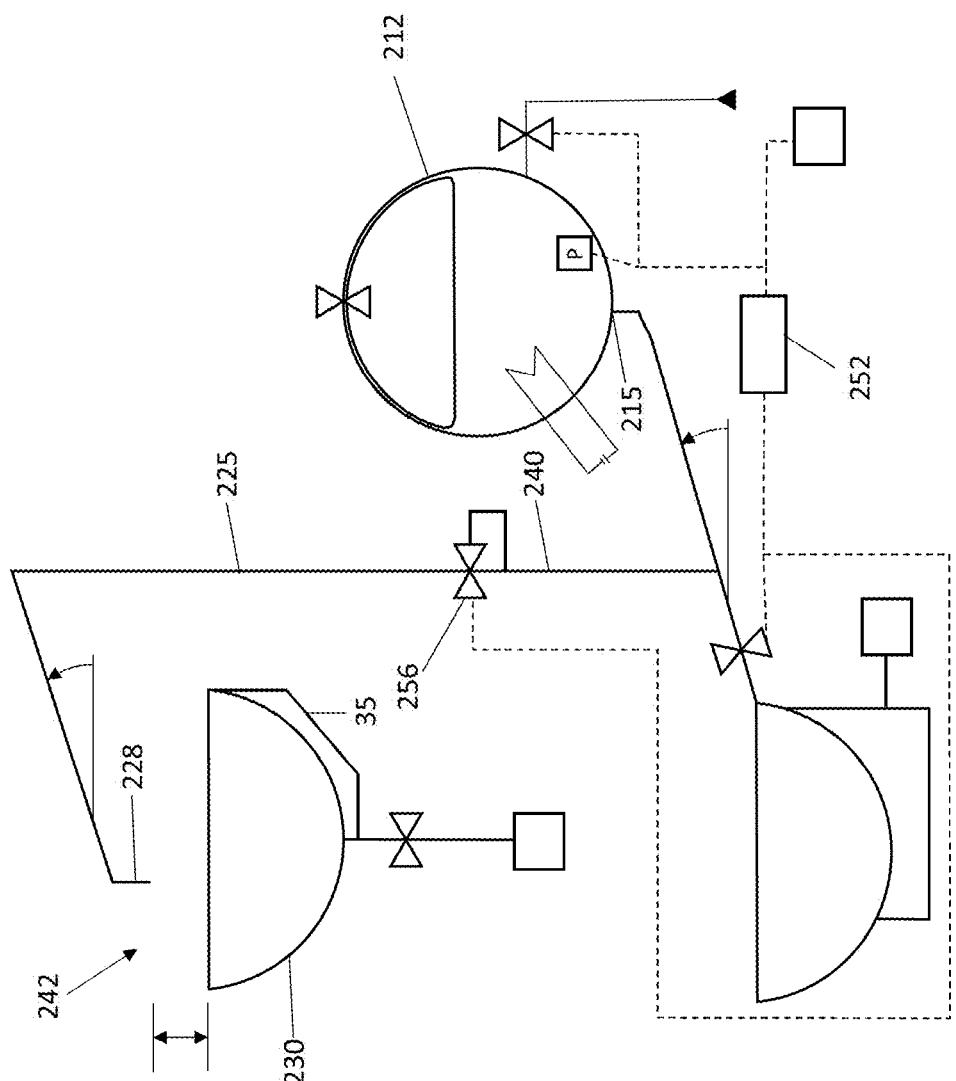
FIG. 3 is a further example of a potable water system comprising a pressurized buffer tank.

FIG. 3 illustrates a system which is similar to that described in FIG. 2. As such, alike reference numerals are used for alike components, further augmented by 100 and duplicate component descriptions are avoided where possible.

In the example of FIG. 3, the buffer tank 212 comprises a single relief and supply outlet 215, and in this example the supply conduit 225 fully defines the relief conduit 240. As in the previous Figure, the supply conduit 225 comprises a number of branches which may correspond to the number of user equipments to which the supply conduit 225 is connected. The relief conduit 240 is defined by the branch of the supply conduit 225 that fluidly connects the user equipment defining the separation element 242 to the buffer tank 212. As such, the previously described supply valve 136 and relief valve 154 (which may be an overpressure valve) are combined into a single relief and supply valve 256 which is controlled by the control unit 252. The combined valve 256 may be electrically operable, may be mechanically operable or may be both electrically and mechanically operable. For example, the combined relief and supply valve 256 may, under normal operation, be electrically operated, but may comprise a mechanism which permits the combined valve 256 to permit the flow of fluid therethrough when the pressure reaches a predetermined threshold.

Once again, the separation element 242 is integrated into the faucet 228 and sink 230. However, it should be noted that, although in FIGS. 1 to 3, the faucet and sink 28, 30, 128, 130, 228, 230 are illustrated as being the separation element, this should not be considered limiting and indeed it is conceivable that another user equipment may function as a separation element, such as a toilet. Further, it should also be noted that it may be possible for the sink to function alone as the separation element. In such an example, the sink may comprise or define a fluid outlet therein which may be connected to the relief conduit such that water may flow from the relief conduit directly into the sink.

In the example of FIG. 3, since no additional relief conduits are required, this system may save space as compared to those described previously, while additionally providing the benefits of integrating the separation component into the user equipment as previously described.

Figures 4A, 4B, 4C, 4D, 4E:
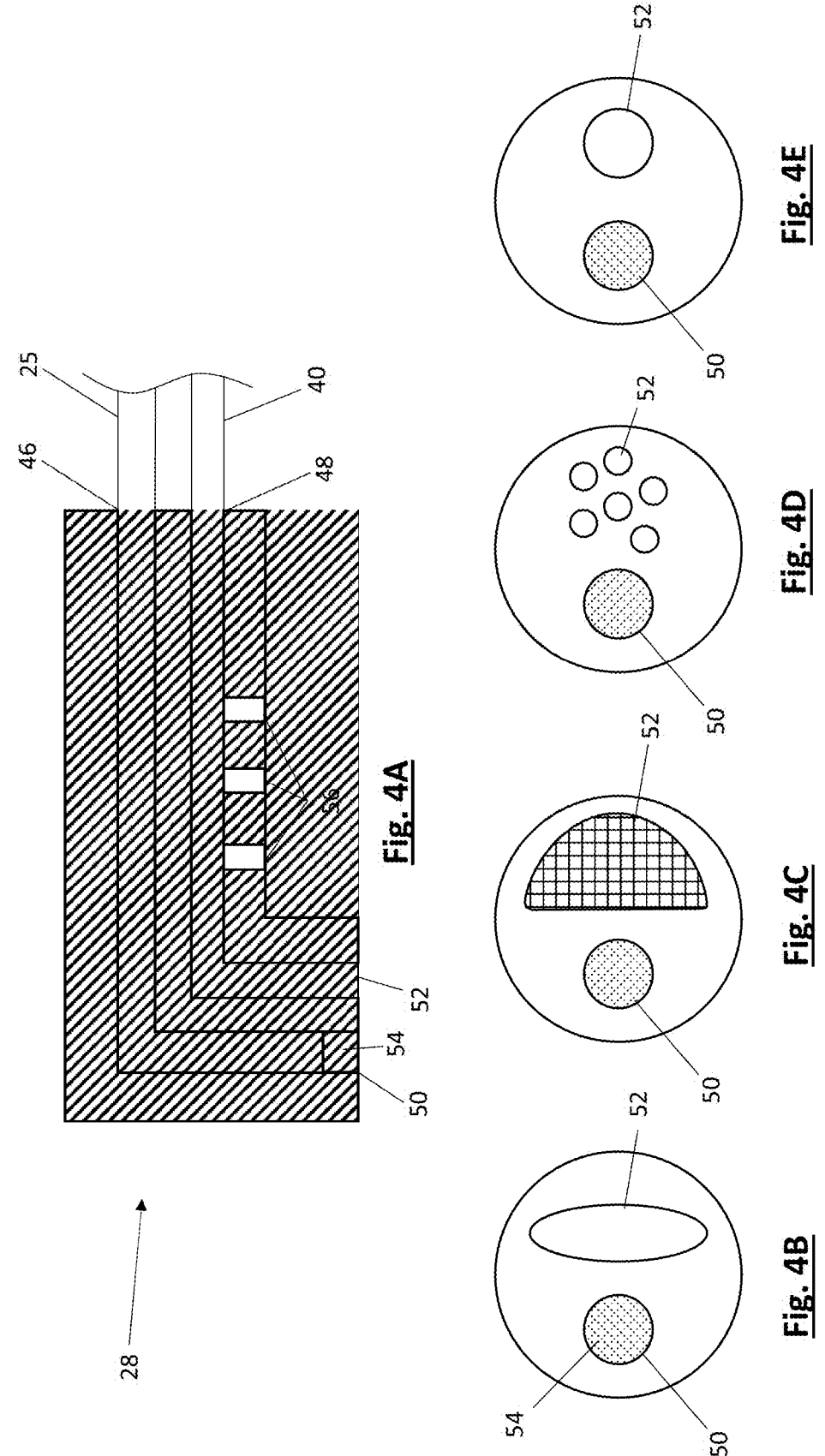
FIGS. 4A-E schematically illustrate a faucet and various outlets thereof.

In FIG. 4A, an example of the faucet 28 as illustrated in FIG. 1 is shown schematically in further detail. Here, the faucet 28 comprises a separate fluid connection point 46, 48 to both the supply conduit 25 and the relief conduit 40 respectively, such that the supply conduit 25 and the relief conduit 40 extend through the faucet 28 (e.g. each to a respective outlet thereof). In this example, the supply conduit 25 and the relief conduit 40 extend separately through the faucet 28, although as has been described it is also possible that these conduits may be combined before or in the faucet 28. The faucet 28 of FIG. 4A therefore comprises a faucet supply outlet 50 and a faucet relief outlet 52. An aerator 54 may optionally be positioned at the faucet supply outlet 50.

The faucet 28 optionally comprises one or a plurality of intermediate relief outlets 56 which may permit fluid flow from the relief conduit 40 extending through the faucet 28 and into the sink. In addition, the faucet relief outlet 52 and intermediate relief outlets 56 may permit an inflow of air into the buffer tank 12, for example in order equalize pressure therein as a result of fluid flowing out of the buffer tank 12 into the supply conduit 25. Further, the additional relief outlets 56 are provided to prevent abuse such as holding the outlets 56 plugged shut with a finger, or placing something in it to clog it.

FIGS. 4B-E illustrate various examples of the outlets 50, 52 of the faucet 28. In particular, FIGS. 4B-E illustrate various examples of the faucet relief outlet 52. FIG. 4B illustrates the relief outlet 52 as an oval-shaped outlet that is bigger than the faucet supply outlet 50, while in FIG. 4C the outlet is once again bigger and comprises a mesh, which may assist to prevent foreign matter from becoming lodged in the faucet relief outlet 52. In FIG. 4D, many small faucet relief outlets 52 are illustrated, while in FIG. 4E a faucet relief outlet 52 is illustrated that is a similar size to the faucet supply outlet 50. Particularly in such an example, the use of intermediate relief outlets 56 in the faucet 28 positioned between the faucet relief outlet 52 and the relief connection point 48 may be employed. The size of the faucet relief outlet 52 may be larger than that of the faucet supply outlet 50 as it is necessary to ensure that a large enough flowrate can be achieved to accommodate the highest anticipated flow rate through the relief conduit 40, as well as to allow for some degree of narrowing of the outlets 52, 56 for example due to mineral build-up.

Although the faucet 28 of FIG. 4A has been described in relation to the non-pressurized buffer tank 12 of FIG. 1, it should be noted that such a faucet 28 may also be applicable in systems having a pressurized buffer tank 12. Equally, a faucet 28 in which the supply conduit 25 and the relief conduit 40 are combined may be used in combination with a non-pressurized buffer tank 12.

Figure 5A:
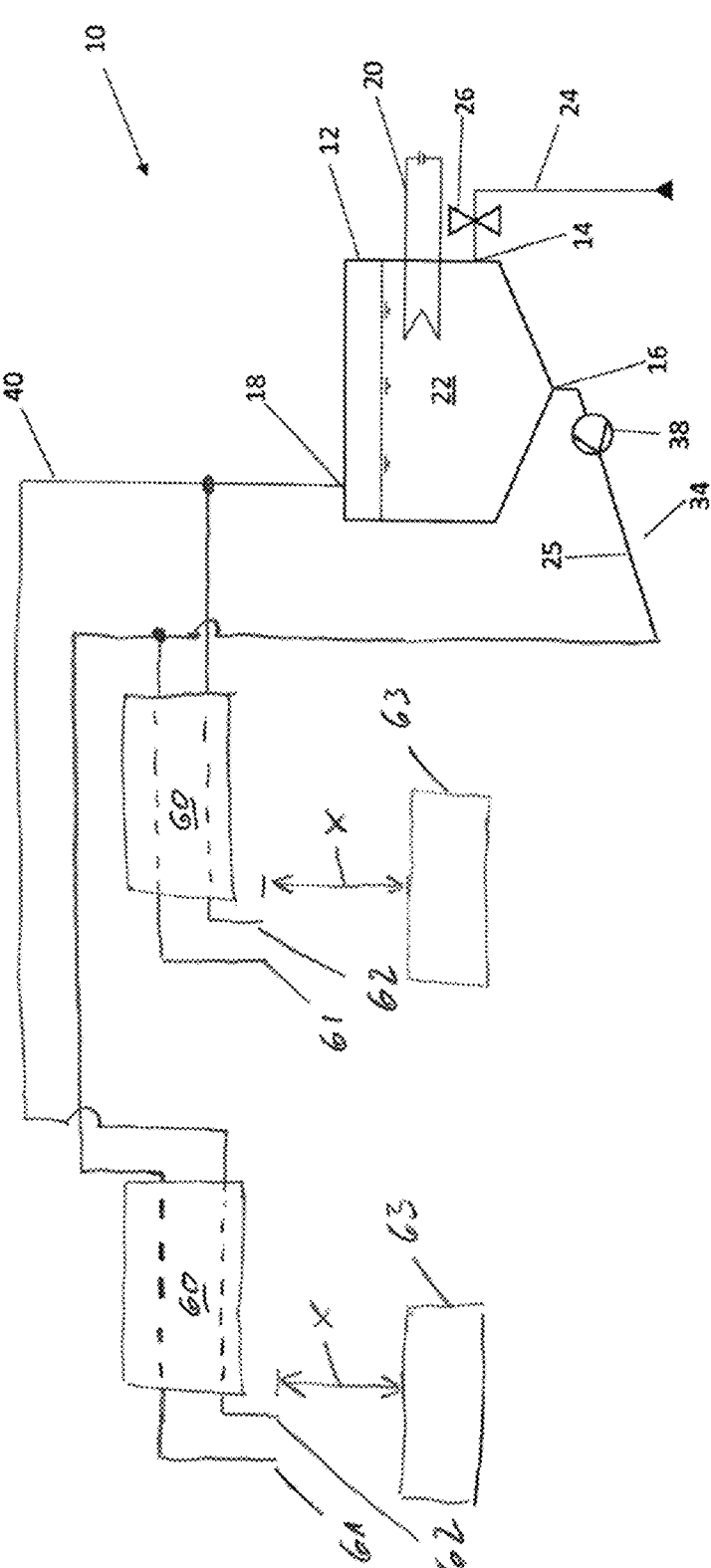
FIG. 5A is a further example of a potable water system comprising a galley insert.

FIG. 5A shows a potable water system 10 similar to FIG. 1. However, the supply outlet 16 of the buffer tank 12 is connected to user equipments in the form of galley inserts (GAIN) 60 via the supply conduit 25. The galley inserts 60 are only schematically shown and may be in the form of a coffee machine or a beverage dispenser. Other types of inserts which also require to be supplied with potable water are also conceivable.

The galley inserts 60 comprise an insert outlet 61 through which e.g. beverages or coffee are supplied to a user for the preparation of which potable water is required. Further, the relief conduit 40 is also connected to the galley inserts 60 and on each galley insert 60 a separation element is formed which comprises a separation element inlet 62 and a separation element outlet 63. The separation element inlet 62 is directly connected with the relief conduit 40 which in the example of FIG. 5A partly extends through the housing of the galley inserts 60 and is hence integrated in the galley inserts 60. The separation element outlet 63 is formed by a drip tray associated with the galley insert 60 and which may be connected to the wastewater system of an aircraft. The separation element outlet 63 is arranged at a vertical distance x below the separation element outlet 62. Hence, also in this example the separation element comprising a separation element inlet 62 and a separation element outlet 63 is formed by a user equipment and it operates in the same manner as already been explained in relation to the example of FIG. 1.

Figure 5B:
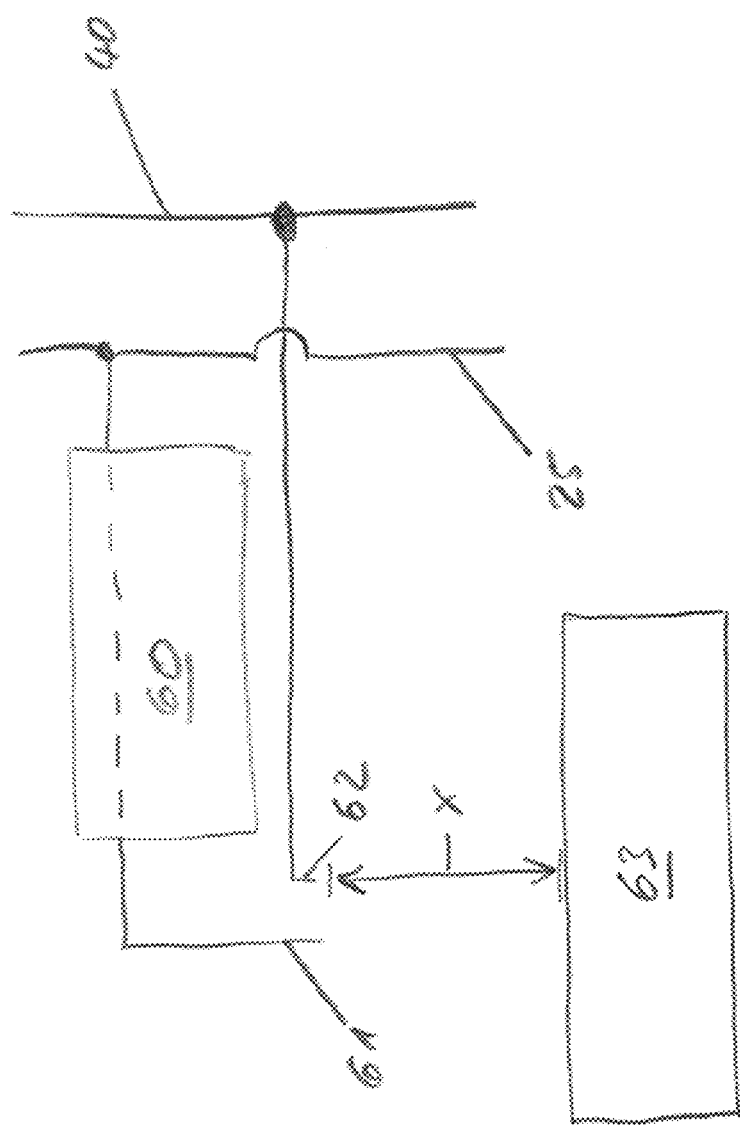
FIG. 5B is an alternative example of a galley insert arranged in a potable water system.

In FIG. 5B an alternative example of the galley insert 60 of FIG. 5A is illustrated. It differs from the example of FIG. 5A in that the relief conduit 40 is arranged adjacent to the housing of the galley insert 60 rather than extending partly through it as in FIG. 5A. Apart from this difference the example of FIG. 5B does not differ from FIG. 5A and operates in the same manner.

Figure 6:
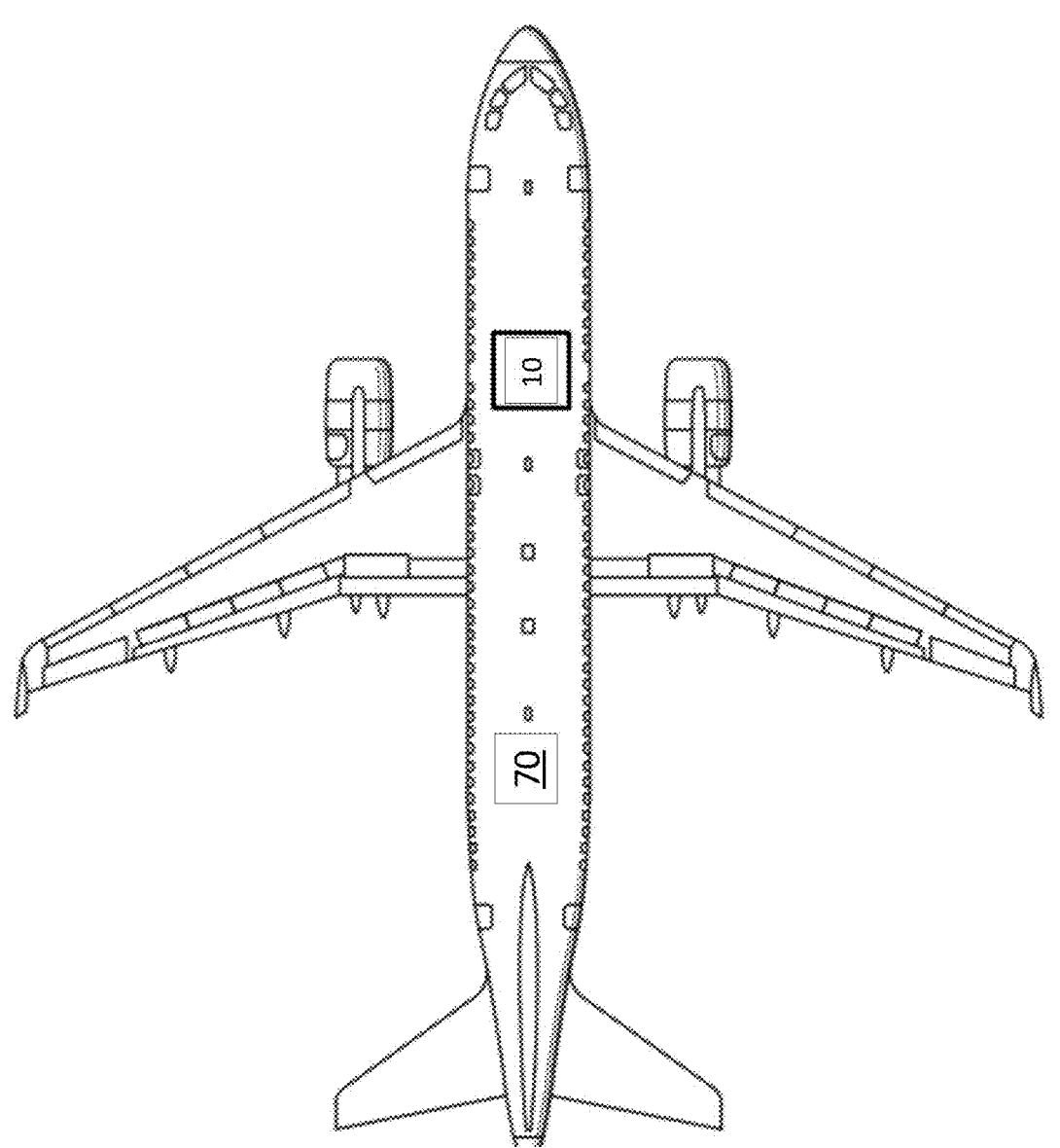
FIG. 6 is an aircraft comprising a potable water system.

FIG. 6 illustrates an example of an aircraft 70 comprising a potable water system 10 integrated therein (although the potable water systems of any of FIGS. 1 to 3 may be integrated therein).

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 10, 110, 210 Potable water system
12, 112, 212 Buffer tank
14, 114 Fluid inlet
16 Supply outlet
18 Relief outlet
20, 120 Heating element
22 Fluid volume
24 Water inflow line
25, 125, 225 Supply conduit
26 Inlet valve
28, 128, 228 Faucet
30, 130, 230 Sink
31 Main outlet
32 Toilet
34 Incline
35 Overflow line
36, 136 Supply valve
38 Supply pump
40, 140, 240 Relief conduit
42, 142, 242 Separation element
44 Wastewater drain
46 Supply connection point
48 Relief connection point
50 Faucet supply outlet
52 Faucet relief outlet
54 Aerator
56 Intermediate relief outlet
60 galley insert (GAIN)
61 galley insert outlet
62 separation element inlet
63 separation element outlet
70 Aircraft
115, 215 Relief and supply outlet
146 Pressure sensor
148 Gas refill valve
150 Volume of air
152, 252 Control unit
154 Relief valve
256 Relief and supply valve

The invention claimed is:

1. A water supply system for use in an aircraft, the water supply system comprising:
   a buffer tank for holding a volume of water comprising a fluid inlet, a supply outlet, and a relief port;
   a supply arrangement for selectively permitting fluid flow from the supply outlet to a user equipment via a supply conduit; and
   a relief arrangement for permitting fluid flow from or into the relief port, the relief arrangement comprising a relief conduit that is in fluid communication with the relief port and comprises a separation element, which is defined by the user equipment and comprises:
      a separation element outlet; and
      a separation element inlet positioned above the separation element outlet;
      wherein the separation element inlet is separated from the separation element outlet by an airgap that defines a separation distance, such that:
         water flowing in a forwards direction, from the separation element inlet and towards the separation element outlet, flows from the separation element inlet to the separation element outlet across the separation distance; and water flowing in a reverse direction, from the separation element outlet and towards the separation element inlet, flows into the separation element outlet and is retained within the separation element inlet;

wherein the relief conduit is configured to allow an inflow of air to the buffer tank through the relief port, the inflow of air being in the reverse direction, to prevent a build-up of negative pressure in the buffer tank as the buffer tank is emptied by the fluid flow out of the supply outlet by the supply arrangement.

2. The water supply system of claim 1, wherein the user equipment is a sink.

3. The water supply system of claim 1, wherein the relief conduit is in fluid communication with a faucet which comprises at least a part of the user equipment.

4. The water supply system of claim 3, wherein the separation element inlet is defined by a faucet.

5. The water supply system of claim 3, wherein the relief conduit and the supply conduit are at least partially integrated into the faucet.

6. The water supply system of claim 3, wherein the separation element outlet is defined by a sink.

7. The water supply system of claim 1, wherein the buffer tank is a pressurized tank, the relief conduit comprises a relief valve, and at least one of:

the buffer tank additionally comprises a pressure sensor and the water supply system comprises a control unit in communication with the pressure sensor and configured to receive and process data from the pressure sensor to operate the relief valve; and the relief valve comprises a relief mechanism configured to permit fluid flow through the relief valve when the pressure at the relief valve inlet surpasses a predetermined value.

8. The water supply system of claim 7, wherein at least part of the supply conduit being defined by the relief conduit.

9. The water supply system of claim 8, wherein the supply conduit comprises a supply valve which is a same valve as the relief valve.

10. The water supply system of claim 1, wherein a diameter of the relief conduit is greater than a diameter of the fluid inlet.

11. The water supply system of claim 1, wherein the separation distance is at least twice a diameter of the relief conduit.

12. A method for draining water from and allowing a passage of air into or out of a buffer tank in an aircraft, the method comprising:

providing the buffer tank, which comprises a fluid inlet, a supply outlet, and a relief port;

attaching a relief conduit to the relief port of the buffer tank;

attaching a supply conduit to the supply outlet of the buffer tank;

providing a user equipment defining a separation element, the separation element comprising:

a separation element outlet; and a separation element inlet positioned above the separation element outlet;

wherein the separation element inlet is separated from the separation element outlet by an airgap that defines a separation distance; and establishing a flow of water between the supply outlet of the buffer tank and the user equipment via the supply conduit; and allowing a flow of water and/or air through the relief conduit, between the user equipment and the relief port of the buffer tank;

wherein the separation element allows the flow of water in a forwards direction, from the separation element inlet and towards the separation element outlet, such that the water flows from the separation element inlet to the separation element outlet across the separation distance; and wherein the separation element prevents the flow of water in a reverse direction, from the separation element outlet and towards the separation element inlet, such that the water flows into the separation element outlet and is retained within the separation element outlet.

13. The method according to claim 12, comprising pressurizing the buffer tank to propel a flow of water from the supply outlet.

14. The method according to claim 12, comprising measuring pressure inside the buffer tank and controlling the flow of water or air between the supply outlet and the user equipment based on the measured pressure.

15. An aircraft comprising the water supply system of claim 1.

16. The water supply system of claim 5, wherein the relief conduit is entirely separated from the supply conduit.

17. The water supply system of claim 1, wherein the supply outlet is in a bottom surface of the buffer tank and the relief port is in a top surface of the buffer tank.

18. The water supply system of claim 17, wherein the relief arrangement is configured to allow a flow of an excess volume of liquid out of the buffer tank for draining into the separation element outlet.

19. The water supply system of claim 18, wherein the separation element outlet is fluidically connected to a wastewater drain.

20. The water supply system of claim 1, wherein the relief conduit comprises a filter or sieve to remove particles or inserts entrained in the inflow of air and prevent such particles or insects from traveling into the buffer tank.

* * * * *